(12) United States Patent
He

(10) Patent No.: US 8,645,519 B2
(45) Date of Patent: Feb. 4, 2014

(54) METHOD FOR INTERACTING MESSAGES BASED ON SIMPLE NETWORK MANAGEMENT PROTOCOL

(75) Inventor: Xiaohong He, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 221 days.

(21) Appl. No.: 13/258,060

(22) PCT Filed: May 20, 2010

(86) PCT No.: PCT/CN2010/072997
§ 371 (c)(1),
(2), (4) Date: Dec. 19, 2011

(87) PCT Pub. No.: WO2010/148849
PCT Pub. Date: Dec. 29, 2010

(65) Prior Publication Data
US 2012/0096137 A1   Apr. 19, 2012

(30) Foreign Application Priority Data

Jun. 23, 2009   (CN) .......................... 2009 1 0142236

(51) Int. Cl.
*G06F 15/173* (2006.01)
(52) U.S. Cl.
USPC ........... 709/223; 709/203; 709/230; 370/328; 370/351; 711/114
(58) Field of Classification Search
USPC .................. 709/223, 230, 203; 370/328, 351; 711/114
See application file for complete search history.

(56) References Cited

U.S. PATENT DOCUMENTS

| | | | | |
|---|---|---|---|---|
| 6,687,735 | B1 * | 2/2004 | Logston et al. | 709/203 |
| 6,941,341 | B2 * | 9/2005 | Logston et al. | 709/203 |
| 7,773,578 | B2 * | 8/2010 | Liu | 370/351 |
| 2004/0165531 | A1 | 8/2004 | Brady | |

(Continued)

FOREIGN PATENT DOCUMENTS

| | | |
|---|---|---|
| CN | 1461139 A | 12/2003 |
| CN | 101459496 A | 6/2009 |
| CN | 101594320 A | 12/2009 |

OTHER PUBLICATIONS

International Search Report for PCT/CN2010/072997 dated Jul. 27, 2010.

*Primary Examiner* — Tammy Nguyen
(74) *Attorney, Agent, or Firm* — Ling Wu; Stephen Yang; Ling and Yang Intellectual Property

(57) ABSTRACT

A method for interacting messages based on a Simple Network Management Protocol (SNMP) is disclosed by the present invention. The method includes: when receiving an SNMP message sent from an SNMP management station, an SNMP proxy estimating a suggested timeout value of the SNMP message and feeding the suggested timeout value back to the SNMP management station; and the SNMP management station waiting for a response of the above SNMP message according to the suggested timeout value. A corresponding SNMP proxy is further disclosed by the present invention. Since the method of the present invention adopts the technical measure of dynamically determining the timeout period of the management station in an interaction manner between the SNMP management station and the SNMP proxy, the drawbacks of manually setting timeout period are overcome, occurrences of timeout event are effectively reduced, and the efficiency of implementing network management using SNMP is improved.

17 Claims, 4 Drawing Sheets

(56) References Cited

U.S. PATENT DOCUMENTS

| | | | |
|---|---|---|---|
| 2004/0236860 A1* | 11/2004 | Logston et al. | 709/230 |
| 2007/0198871 A1 | 8/2007 | Nelken | |
| 2008/0069032 A1* | 3/2008 | Liu | 370/328 |
| 2011/0071988 A1* | 3/2011 | Resch et al. | 707/691 |
| 2011/0072210 A1* | 3/2011 | Dhuse | 711/114 |
| 2011/0072321 A1* | 3/2011 | Dhuse | 714/55 |
| 2012/0096137 A1* | 4/2012 | He | 709/223 |

\* cited by examiner

METHOD FOR INTERACTING MESSAGES BASED ON SIMPLE NETWORK MANAGEMENT PROTOCOL

TECHNICAL FIELD

The present invention relates to the field of network management using the Simple Network Management Protocol (SNMP) as a management interface, and in particular, to a method for interacting messages based on SNMP.

BACKGROUND ART

SNMP is a set of network management protocols based on Simple Gateway Monitor Protocol (SGMP) defined by The Internet Engineering Task Force (IETF). By means of SNMP, a management station can remotely manage all network devices that support the protocol, including monitoring a network state, amending network device configuration, receiving a network event alarm, etc. SNMP adopts a special form of Client/Server mode, i.e., proxy/station mode, and the management and maintenance of the network is carried out through interaction between an SNMP management station and an SNMP proxy. Each SNMP proxy is responsible for responding to various queries and settings of the SNMP management station about Management Information Base (MIB) definition information, and initiatively reporting events such as alarms etc. to the SNMP management station in a manner of trap.

The current process for interacting messages between an SNMP management station and an SNMP proxy is as shown in FIG. 1. The SNMP management station sends an SNMP message, such as Get, Get-Next, Get-Bulk, Set request and so on, to the SNMP proxy, and the SNMP proxy implements internal processing after receiving the request and returns a response to the SNMP management station. When sending the request to the SNMP proxy, the SNMP management station will set a certain timeout period for processing this request so as to prevent the SNMP management station from being always blocked in a response receiving state when the SNMP proxy is unable to return a response due to occurrence of abnormity. The SNMP management station waits for the response returned by the SNMP proxy before timeout, and the system recover to the normal state after timeout, and meanwhile the interface outputs a timeout result. The timeout period of the SNMP management station is generally a default value, and may also be manually set.

The time for processing data for different managed devices is different, and the time for processing different requests for the same managed device is also different. Especially in a telecommunication network device, due to the large amount of data, the time for processing query and setting requests is relatively longer and often exceeds the timeout period set by the SNMP management station. Multiple times of timeout may cause a series of problems: 1) the SNMP management station is unable to obtain the desired data or is unable to acquire the setting result for the managed device; 2) the administrator may execute query or configuration operation once again immediately after the SNMP management station timing out, but the SNMP management station is still processing the previous message, and thus the processing load of the SNMP proxy is increased.

To solve the above problem of timeout, one method is to manually adjust the timeout period at the SNMP management station. However, generally, the administrator is impossible to completely know all devices and the time for the devices to process different requests, therefore, there is a big limitation if the timeout period is determined by an administrator. If the set timeout period is too short, the above timeout event is apt to occur; while if the set timeout period is too long, then the efficiency of the administrator's operation will be greatly affected and time will be wasted when the response is unable to be returned due to abnormality occurs during the process of the SNMP proxy processing the request.

SUMMARY OF THE INVENTION

The technical problem to be solved in the present invention is to provide a method for interacting messages based on SNMP and an SNMP proxy so as to solve the existing problem of SNMP timeout management deficiency.

In order to solve the above problem, the present invention provides a method for interacting messages based on a Simple Network Management Protocol (SNMP), which comprises:

when receiving an SNMP message sent from an SNMP management station, an SNMP proxy estimating a suggested timeout value of the SNMP message and feeding the suggested timeout value back to the SNMP management station; and the SNMP management station waiting for a response of the SNMP message according to the suggested timeout value.

The above method may be further characterized in that: the SNMP proxy stores a timeout threshold value;

said step of the SNMP proxy estimating the suggested timeout value of the SNMP message and feeding the suggested timeout value back to the SNMP management station comprises:

after estimating and obtaining the suggested timeout value of the SNMP message, the SNMP proxy judging whether the suggested timeout value is greater than the timeout threshold value; if yes, feeding the suggested timeout value that is estimated back to the SNMP management station.

The above method may be further characterized in that: said step of the SNMP proxy estimating the suggested timeout value of the SNMP message and feeding the suggested timeout value back to the SNMP management station further comprises: processing the SNMP message that has been received according to a conventional flow if the SNMP proxy determines that the suggested timeout value is smaller than or equal to the timeout threshold value.

The above method may be further characterized in that: the timeout threshold value is set by the SNMP management station for the SNMP proxy.

The above method may be further characterized in that: the timeout threshold value is a timeout value of the SNMP message preset on the SNMP management station.

The above method may be further characterized in that: the SNMP proxy is provided with an enabling flag bit;

said step of the SNMP proxy estimating the suggested timeout value of the SNMP message and feeding the suggested timeout value back to the SNMP management station comprises:

when receiving the SNMP message, the SNMP proxy firstly judging whether a current value of the enabling flag bit represents an enabled state, and only if yes, the SNMP proxy estimating the suggested timeout value of the SNMP message and performing subsequent feedback.

The above method may be further characterized in that: the value of the enabling flag bit is set by the SNMP management station for the SNMP proxy.

The above method may be further characterized in that: said step of the SNMP management station waiting for the response of the SNMP message according to the suggested timeout value comprises:

the SNMP management station setting a local timeout value for waiting for the response of the SNMP message as the suggested timeout value fed back by the SNMP proxy, and waiting for the response of the SNMP message within the range of the suggested timeout value.

The above method may be further characterized in that:

after receiving the response of the SNMP message, the SNMP management station resets the local timeout value as a local default timeout value.

The above method may be further characterized in that:

said step of the SNMP proxy estimating the suggested timeout value of the SNMP message further comprises: the SNMP proxy reading of processing time corresponding to a corresponding operation type from a processing time table of a database, and multiplying the processing time by a number of boards currently managed by the SNMP proxy to obtain the suggested timeout value.

The present invention further provides a Simple Network Management Protocol (SNMP) proxy, which is configured to:

when receiving an SNMP message sent from an SNMP management station, estimate a suggested timeout value of the SNMP message and feed the suggested timeout value back to the SNMP management station.

The SNMP proxy stores a timeout threshold value; the timeout threshold value is set by the SNMP management station for the SNMP proxy;

the SNMP proxy is configured to: estimate and obtain the suggested timeout value of the SNMP message, and then judge whether the suggested timeout value is greater than the timeout threshold value; and if yes, feed the suggested timeout value that is estimated back to the SNMP management station.

The SNMP proxy is further configured to: process the SNMP message that has been received according to a conventional flow if the suggested timeout value is smaller than or equal to the timeout threshold value is determined.

The SNMP proxy is provided with an enabling flag bit;

the SNMP proxy is configured to: when receiving the SNMP message, firstly judge whether a current value of the enabling flag bit represents an enabled state, and only if yes, estimate the suggested timeout value of the SNMP message and perform subsequent feedback.

The SNMP proxy is further configured to: read of processing time corresponding to a corresponding operation type from a processing time table of a database, and multiply the processing time by a number of boards currently managed by the SNMP proxy to obtain the suggested timeout value.

Compared with the related art, since the method of the present invention adopts the technical measure of dynamically determining the timeout period of the management station in an interaction manner between the SNMP management station and the SNMP proxy, the drawbacks of manually setting timeout period are overcome, occurrences of timeout event are effectively reduced, and the efficiency of implementing network management using SNMP is improved.

PREFERRED EMBODIMENTS OF THE INVENTION

The technical scheme of the present invention will be further described in detail below with reference to the drawings and examples.

Figure 1:
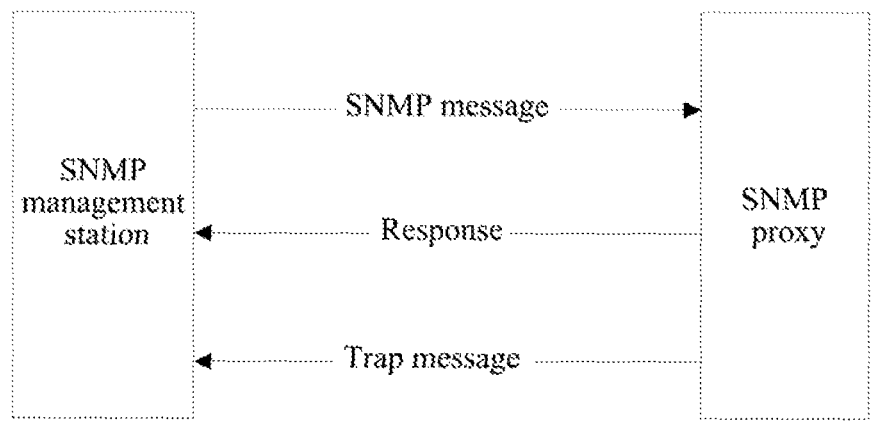
FIG. 1 is a schematic diagram of the process for interacting messages between an SNMP management station and an SNMP proxy in the related art.
Figure 2:
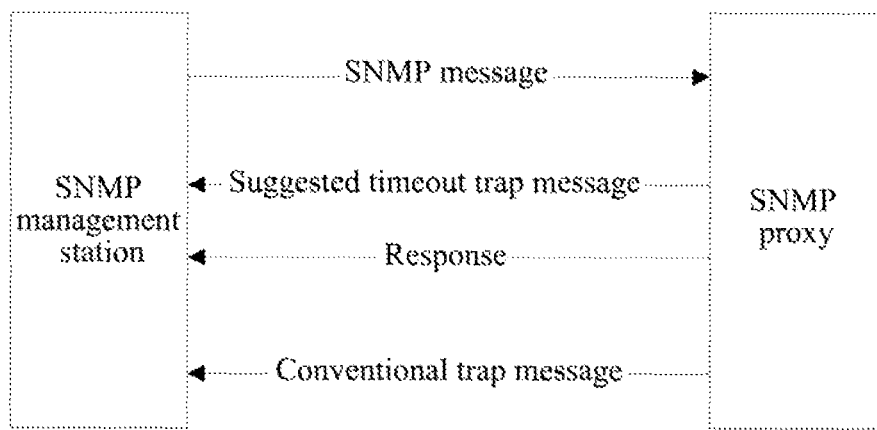
FIG. 2 is a schematic diagram of the process for interacting messages between an SNMP management station and an SNMP proxy according to an example of the present invention.

As shown in FIG. 2, the basic concept of the present invention is that when receiving an SNMP message sent by an SNMP management station, an SNMP proxy estimates a suggested timeout value of the SNMP message and feeds the suggested timeout value back to the SNMP management station; and the SNMP management station waits for a response of the SNMP message according to the suggested timeout value.

Considering that certain time and resources need to be consumed for the SNMP proxy estimating the suggested timeout value of the message and both of the communication parties constructing and analyzing the message, preferably, the SNMP proxy may feed the suggested timeout value back to the SNMP management station only if the estimated suggested timeout value exceeds a threshold value, wherein the threshold value may be set by the SNMP management station for the SNMP proxy, and the threshold value may be a timeout value of the SNMP message preset on the SNMP management station. In addition, the SNMP proxy may be provided with an enabling flag bit, and the suggested timeout value of the message is estimated when the SNMP message is received only when the value of the enabling flag bit is set as an enabled state; otherwise, operation is still made according to the related flow in the related art. Of course, the value of the enabling flag bit may be still set by the SNMP management station for the SNMP proxy.

In practical applications, a timeout management object group (snmpTimeOut) may be added in MIB of the SNMP proxy, as shown in Table 1, wherein there are three objects: the enabling flag bit of the suggested timeout object (enableSuggestedTimeOut), timeout threshold (timeOutThreshold) and suggested timeout (suggestedTimeOut). Meanwhile, a suggested timeout trap (suggestedTimeOutTrap) message is added correspondingly, and the SNMP proxy binds the estimated value of suggestedTimeOut with the suggestedTimeOutTrap message and reports it to the SNMP management station to feed back the estimated suggested timeout value.

TABLE 1 objects of the snmpTimeOut group

| Object | Grammar | Visit | Description |
|---|---|---|---|
| enableSuggestedTimeOut | INTEGER | RW | the enabling flag bit of the suggestedTimeOut object, the SNMP proxy needs to estimate the suggested timeout of the received SNMP message only when the value of the enabling |

TABLE 1-continued objects of the snmpTimeOut group

| Object | Grammar | Visit | Description |
|---|---|---|---|
| | | | flag bit of the suggestedTimeOut represents an enabled state |
| timeOutThreshold | TimeTicks | RO | timeout threshold |
| suggestedTimeOut | TimeTicks | RO | suggested timeout |

In this case, the method for interacting messages based on SNMP mainly comprises the following steps.

(a) The SNMP proxy checks the value of the enabling flag bit of the suggested timeout object after receiving an SNMP message, and if the value represents an enabled state, the SNMP proxy estimates a suggested timeout value according to the specific operation type of the current request. The estimation way may be as follows: reading of the processing time corresponding to the operation type from a processing time table of the proxy database, and multiplying the processing time by the current operation state factor of the device (i.e., the number N of boards currently managed by the SNMP proxy). If the suggested timeout value that is estimated is greater than the time threshold value, then the estimated suggested timeout value is bound with the suggestedTimeOut object, and the estimated suggested timeout value is reported to the SNMP management station through sending a suggestedTimeOutTrap message, wherein the request ID (request-id) value of this trap message is the request-id value of the above SNMP message received by the SNMP proxy; if the value of the enabling flag bit represents a disabled state, or the value of the enabling flag bit represents an enabled state but the estimated suggested timeout value is smaller than or equal to the timeout threshold, then the SNMP proxy will process the SNMP message according to the existing flow (i.e., not feeding the estimated suggested timeout period back to the SNMP management station), and the SNMP management station will still wait for the response fed back by the SNMP proxy within the preset timeout period according to the flow of the existing protocol, i.e., not performing the subsequent flow.

(b) The SNMP management station judges whether the request-id included in the message is the same with the request-id of the SNMP message that has been sent after receiving the suggestedTimeOutTrap message, and if the request-id included in the message is the same with the request-id of the SNMP message that has been sent, the SNMP management station sets the local timeout value for waiting for the response of the SNMP message as the suggested timeout value included in the trap message, and waits for a response returned by the SNMP proxy according to the suggested timeout value.

(c) The SNMP management station performs conventional processing on the response if it receives the response within the range of the timeout period, and amends the local timeout value for waiting for the response of the SNMP message to a local default timeout value.

Furthermore, before executing the above step (a), the SNMP management state may set the enabling flag bit of the suggested timeout object and the timeout threshold value through the two objects of enableSuggestedTimeOut and suggestedTimeOutTrap whenever necessary, and generally sets the timeout threshold value as the default timeout value used locally by the SNMP management station. When the estimated suggested timeout value is greater than the local default timeout value of the management station, i.e., there may exist timeout event, the SNMP proxy will report the estimated suggested timeout value to the SNMP management station; when the estimated suggested timeout value is not greater than the default timeout value of the management station, the SNMP proxy and the SNMP management station do not perform additional processing. When the enabling flag bit of the local default suggested timeout object of the SNMP proxy is the disabled state, the default timeout threshold value is 0.

In addition, in a case that the SNMP management station does not have the ability to automatically analyze and process the suggestedTimeOutTrap message and automatically set timeout period, the administrator may manually set the local default timeout value as the estimated timeout value included in the suggestedTimeOutTrap message according to practical conditions after the SNMP management station receiving the suggestedTimeOutTrap message. It is suggested to manually reset the local timeout value as the default timeout value of the SNMP management station, i.e., the value of timeOutThreshold, after completing operations with the same type.

In conclusion, the introduction of the two parameters of the enabling flag bit of the suggested timeout object and the timeout threshold can avoid the unnecessary processing procedure of timeout management and processing procedures of creating, sending and receiving a suggestedTimeOutTrap message and so on, thereby ensuring high efficiency of message interaction between an SNMP management station and an SNMP proxy.

The specific steps for the SNMP management station and SNMP proxy implementing the technical scheme of the present invention and the coordination flow of the two parties will be further described in detail below with reference to the drawings.

Figure 3:
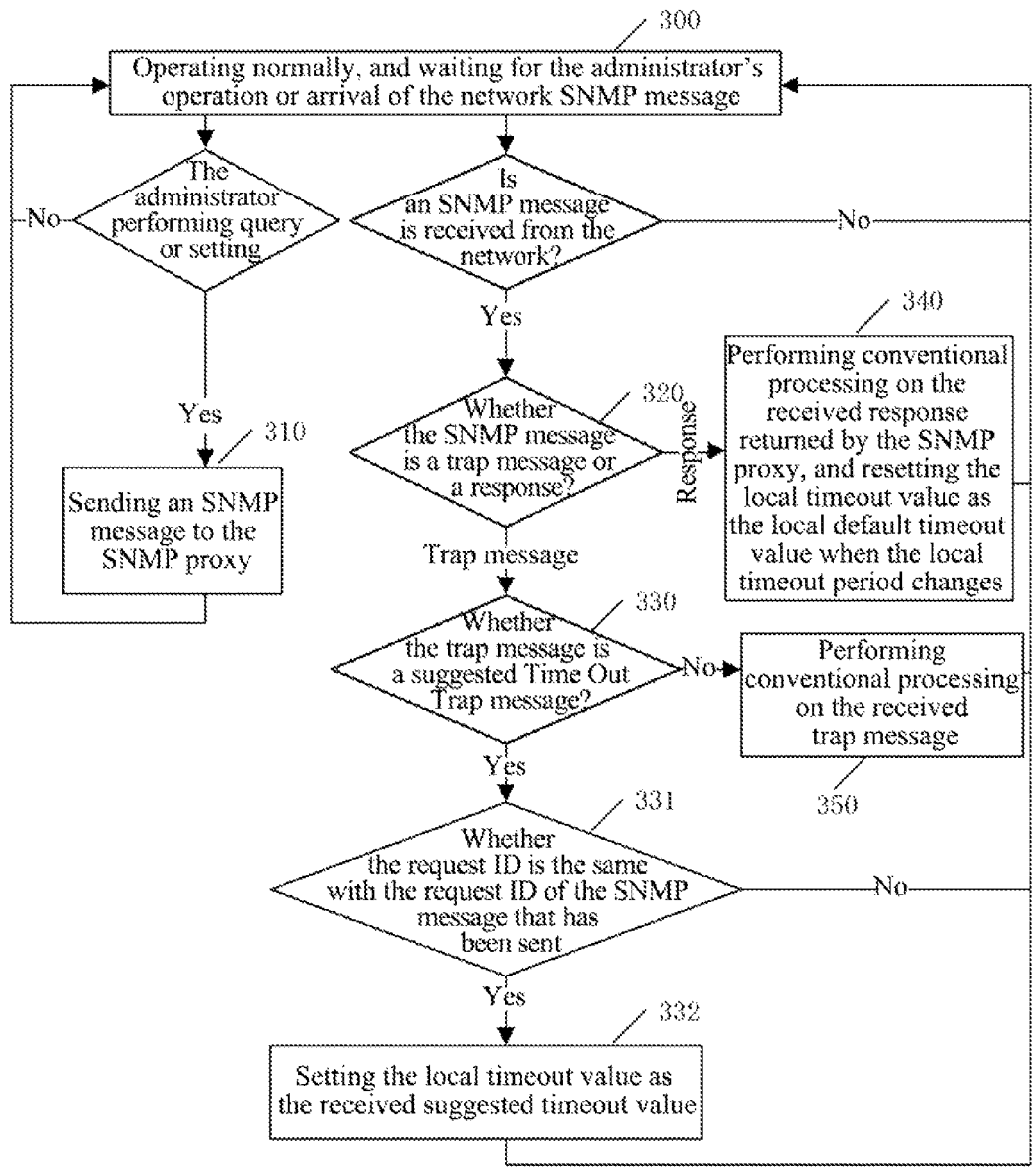
FIG. 3 is flow chart of the steps of the SNMP management station carrying out the present invention according to an example of the present invention.

As shown in FIG. 3, the operation steps for the SNMP management station carrying out the present invention are as follows.

Step 300, the SNMP management station system operate normally, and waits for the administrator's operation or arrival of the network SNMP message. If the administrator performs query or setting operation, step 301 is executed; if the network SNMP message arrives, step 320 is executed.

Step 310, the SNMP management station sends an SNMP message to the SNMP proxy, and then step 300 is executed.

Step 320, it is judged whether the received message is a trap message or a response message; if it is a trap message, step 330 is executed; if it is a response message, step 340 is executed.

Step 330, it is judged whether the received trap message is a suggestedTimeOutTrap message, if yes, step 331 is executed; if the received message is a conventional trap message, step 350 is executed.

Step 331, it is judged whether the parameter request-id in the received suggestedTimeOutTrap message is the same with the request-id of the message that has been sent currently. If yes, step 332 is executed; otherwise, it means that the received message is an invalid suggestedTimeOutTrap message, and no processing is performed and step 300 is executed.

Step 332, the suggested timeout (suggestedTimeOut) data included in the suggestedTimeOutTrap are extracted, and the local timeout value of this SNMP management station is set as the suggested timeout value. Step 300 is executed.

Step 340, the conventional processing is performed on the received response returned by the SNMP proxy, the local timeout value is reset as the local default timeout value when the local timeout period changes, and step 300 is executed.

Step 350, conventional processing is performed on the received trap message, and step 300 is performed.

Figure 4:
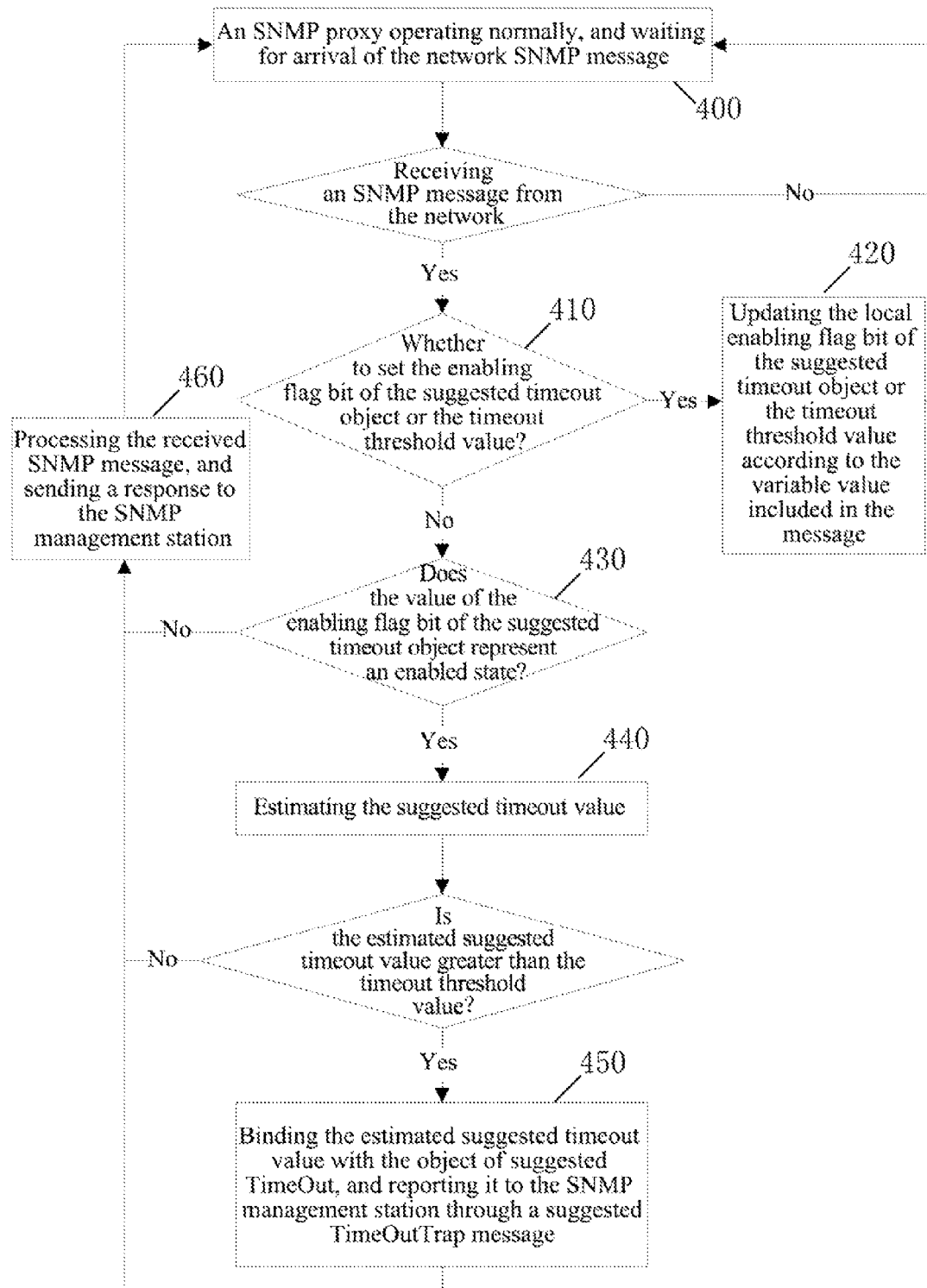
FIG. 4 is a flow chart of the SNMP proxy carrying out the present invention according to an example of the present invention.

As shown in FIG. 4, the operation steps for the SNMP proxy carrying out the present invention are as follows.

Step 400, an SNMP proxy system operates normally, and waits for arrival of the network SNMP message. If the network SNMP message is received, step 410 is performed.

Step 410, it is judged whether the received SNMP message sets enableSuggestedTimeOut or suggestedTimeOutTrap. If yes, step 420 is executed; otherwise, it is regarded that the received message is a conventional SNMP message, and step 430 is executed.

Step 420, the enabling flag bit of the local suggested timeout object or the timeout threshold value are updated according to the variable value included in the message, and then step 400 is executed.

Step 430, it is judged whether the value of the enabling flag bit of the suggested timeout object represents an enabled state, and if yes, step 440 is executed; otherwise, step 460 is executed.

Step 440, the suggested timeout value is estimated, and it is judged whether the estimated suggested timeout value is greater than the timeout threshold value, and if yes, step 450 is executed; otherwise, it means that the time period required by this operation is short, there will be no timeout, and no special processing needs to be performed, and step 460 is executed.

Step 450, the estimated timeout value is bound with the object suggestedTimeOut, and is reported the SNMP management station through a suggestedTimeOutTrap message.

Step 460, conventional processing is performed on the received SNMP message, and a response message is constructed to send to the SNMP management station, and step 400 is executed.

Figure 5:
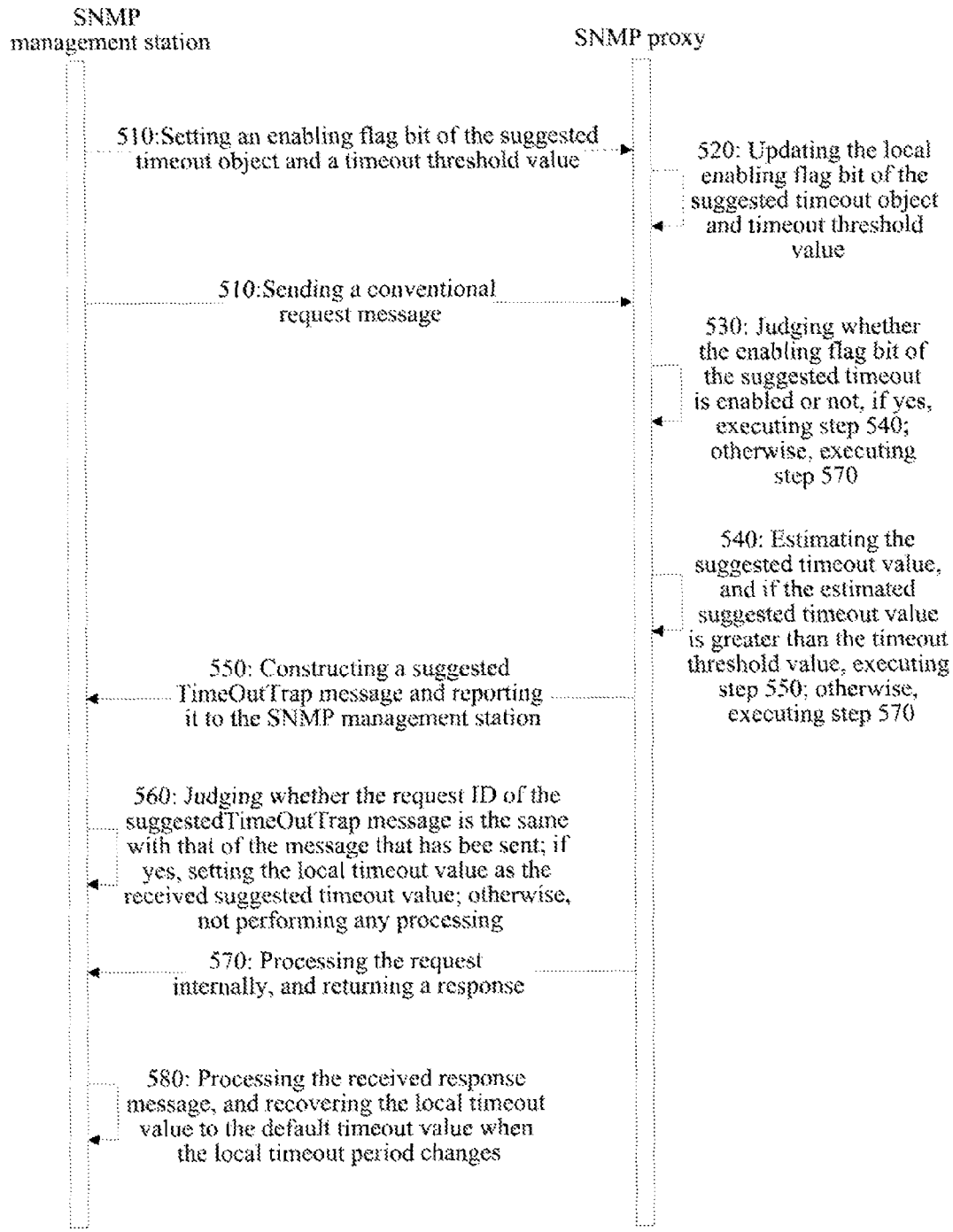
FIG. 5 is a flow chart of coordination between an SNMP management station and an SNMP proxy for carrying out the present invention according to an example of the present invention.

As shown in FIG. 5, the flow of coordination between an SNMP management station and an SNMP proxy for carrying out the present invention is as follows.

Step 510, an SNMP management station sends a request for setting an enabling flag bit of the suggested timeout object and a timeout threshold value (note: this step may be executed at any moment of communication, or may be not executed) or a conventional request message to an SNMP proxy.

Step 520, the SNMP proxy updates the local parameter values of the system after receiving the setting request.

Step 530, the SNMP proxy judges the value of the enabling flag bit of the local suggested timeout after receiving the SNMP request message, wherein there are the following two cases:

a) if the value of the enabling flag bit of the local suggested timeout represents a disabled state, step 570 is executed;

b) if the value of the enabling flag bit of the local suggested timeout represents an enabled state, step 540 is executed.

Step 540, the SNMP proxy estimates the suggested timeout value, and if the estimated suggested timeout value is smaller than or equal to the timeout threshold value, step 570 is executed; otherwise, step 550 is executed.

Step 550, the SNMP proxy constructs a suggestedTimeOutTrap message and reporting it to the SNMP management station, wherein the suggestedTimeOutTrap message includes the above estimated suggested timeout value.

Step 560, the SNMP management station performs a validity judgment according to the request-id in the suggestedTimeOutTrap message after receiving the suggestedTimeOutTrap message, and if it is a valid suggestedTimeOutTrap message, the local timeout value is updated; otherwise, any processing is not performed.

Step 570, the SNMP proxy processes a conventional request message, and constructs a response and returns the response to the SNMP management station.

Step 580, the SNMP management station performs conventional processing after receiving the response within the range of the timeout period, and resets the local timeout value as the default timeout value of the SNMP management station when the local timeout value changes.

It should be pointed out that the order for executing steps 560 and 570 is not fixed as long as these two steps are prior to steps 550 and 580.

Through the above steps, a method of estimating a timeout value is used by means of coordination between an SNMP management station and an SNMP proxy to be able to achieve dynamic configuration of the timeout period of the SNMP management station, which efficiently avoids occurrence of timeout event caused by unreasonable configuration of the timeout period, thereby improving efficiency of network management.

Of course, the present invention may have many other examples, and a person having ordinary skill in the art can make various corresponding modifications and transformations according to the present invention without departing from the sprit and essence of the present invention. These corresponding modifications and transformations, however, shall fall into the protection scope defined by the attached claims of the present invention.

INDUSTRIAL APPLICABILITY

Compared with the related art, since the method of the present invention adopts the technical measure of dynamically determining the timeout period of the management station in an interaction manner between the SNMP management station and the SNMP proxy, the drawbacks of manually setting timeout are overcome, occurrences of timeout event are effectively reduced, and the efficiency of implementing network management using SNMP is improved.

What is claimed is:

1. A method for interacting messages based on a Simple Network Management Protocol (SNMP), which comprises:

when receiving an SNMP message sent from an SNMP management station, an SNMP proxy estimating a suggested timeout value of the SNMP message and feeding the suggested timeout value back to the SNMP management station; and, the SNMP management station waiting for a response of the SNMP message according to the suggested timeout value;

wherein, said step of the SNMP proxy estimating the suggested timeout value of the SNMP message comprises: the SNMP proxy reading of processing time corresponding to a corresponding operation type from a processing time table of a database, and multiplying the processing time by a number of boards currently managed by the SNMP proxy to obtain the suggested timeout value.

2. The method according to claim 1, wherein the SNMP proxy stores a timeout threshold value;

said step of the SNMP proxy estimating the suggested timeout value of the SNMP message and feeding the suggested timeout value back to the SNMP management station comprises:

after estimating and obtaining the suggested timeout value of the SNMP message, the SNMP proxy judging whether the suggested timeout value is greater than the timeout threshold value; if yes, feeding the suggested timeout value that is estimated back to the SNMP management station.

3. The method according to claim 2, wherein said step of the SNMP proxy estimating the suggested timeout value of the SNMP message and feeding the suggested timeout value back to the SNMP management station further comprises:
  if the SNMP proxy determines that the suggested timeout value is smaller than or equal to the timeout threshold value, processing the SNMP message that has been received according to a conventional flow.

4. The method according to claim 3, wherein
the timeout threshold value is set by the SNMP management station for the SNMP proxy.

5. The method according to claim 2, wherein
the timeout threshold value is set by the SNMP management station for the SNMP proxy.

6. The method according to claim 5, wherein
the timeout threshold value is a timeout value of the SNMP message preset on the SNMP management station.

7. The method according to any one of claims 2, wherein
the SNMP proxy is provided with an enabling flag bit;
said step of the SNMP proxy estimating the suggested timeout value of the SNMP message and feeding the suggested timeout value back to the SNMP management station comprises:
  when receiving the SNMP message, the SNMP proxy firstly judging whether a current value of the enabling flag bit represents an enabled state, and only if yes, the SNMP proxy estimating the suggested timeout value of the SNMP message and performing subsequent feedback.

8. The method according to claim 2, wherein
said step of the SNMP management station waiting for the response of the SNMP message according to the suggested timeout value comprises:
  the SNMP management station setting a local timeout value for waiting for the response of the SNMP message as the suggested timeout value fed back by the SNMP proxy, and waiting for the response of the SNMP message within the range of the suggested timeout value.

9. The method according to claim 8, which further comprises:
  after receiving the response of the SNMP message, the SNMP management station resetting the local timeout value as a local default timeout value.

10. The method according to any one of claims 1, wherein
the SNMP proxy is provided with an enabling flag bit;
said step of the SNMP proxy estimating the suggested timeout value of the SNMP message and feeding the suggested timeout value back to the SNMP management station comprises:
  when receiving the SNMP message, the SNMP proxy firstly judging whether a current value of the enabling flag bit represents an enabled state, and only if yes, the SNMP proxy estimating the suggested timeout value of the SNMP message and performing subsequent feedback.

11. The method according to claim 10, wherein
the value of the enabling flag bit is set by the SNMP management station for the SNMP proxy.

12. The method according to claim 1, wherein
said step of the SNMP management station waiting for the response of the SNMP message according to the suggested timeout value comprises:
  the SNMP management station setting a local timeout value for waiting for the response of the SNMP message as the suggested timeout value fed back by the SNMP proxy, and waiting for the response of the SNMP message within the range of the suggested timeout value.

13. The method according to claim 12, which further comprises:
  after receiving the response of the SNMP message, the SNMP management station resetting the local timeout value as a local default timeout value.

14. A Simple Network Management Protocol (SNMP) proxy, which is configured to:
  when receiving an SNMP message sent from an SNMP management station, estimate a suggested timeout value of the SNMP message and feed the suggested timeout value back to the SNMP management station;
  wherein the SNMP proxy is further configured to: read of processing time corresponding to a corresponding operation type from a processing time table of a database, and multiply the processing time by a number of boards currently managed by the SNMP proxy to obtain the suggested timeout value.

15. The SNMP proxy according to claim 14, wherein the SNMP proxy stores a timeout threshold value; the timeout threshold value is set by the SNMP management station for the SNMP proxy;
  the SNMP proxy is configured to: estimate and obtain the suggested timeout value of the SNMP message, and then judge whether the suggested timeout value is greater than the timeout threshold value; and if yes, feed the suggested timeout value that is estimated back to the SNMP management station.

16. The SNMP proxy according to claim 15, wherein the SNMP proxy is further configured to: process the SNMP message that has been received according to a conventional flow if the suggested timeout value is smaller than or equal to the timeout threshold value is determined.

17. The SNMP proxy according to claim 14, wherein the SNMP proxy is provided with an enabling flag bit;
  the SNMP proxy is configured to: when receiving the SNMP message, firstly judge whether a current value of the enabling flag bit represents an enabled state, and only if yes, estimate the suggested timeout value of the SNMP message and perform subsequent feedback.

* * * * *